(12) United States Patent
Reina

(10) Patent No.: US 6,999,520 B2
(45) Date of Patent: Feb. 14, 2006

(54) EFFICIENT FFT IMPLEMENTATION FOR ASYMMETRIC DIGITAL SUBSCRIBER LINE (ADSL)

(75) Inventor: Guy Reina, Givatayim (IL)

(73) Assignee: Tioga Technologies, Tel Aviv (IL)

( * ) Notice: Subject to any disclaimer, the term of this patent is extended or adjusted under 35 U.S.C. 154(b) by 762 days.

(21) Appl. No.: 10/057,751

(22) Filed: Jan. 24, 2002

(65) Prior Publication Data

US 2003/0169823 A1 Sep. 11, 2003

(51) Int. Cl.
*H04L 27/28* (2006.01)
*H04K 1/10* (2006.01)
(52) U.S. Cl. .................. 375/260; 375/222; 704/269
(58) Field of Classification Search ................ 375/260, 375/222
See application file for complete search history.

(56) References Cited

U.S. PATENT DOCUMENTS 4,791,590 A * 12/1988 Ku et al. ................ 708/404
5,481,488 A * 1/1996 Luo et al. ................ 708/404
6,411,978 B1 * 6/2002 Naveh et al. ............... 708/404

OTHER PUBLICATIONS

Split-Radix Fast Fourier Transform Using Streaming SIMD Extensions, Version 2.1, Jan. 28, 1999.
Tom Irvine, "The Fast Fourier Transform (FFT)", Nov. 15, 1998.
Charles Wu, Implementing the Radix-4 Decimation in Frequency (DIF) Fast Fourier Transform (FFT) Algorithm Using a TMS320C80 DSP, *Digital Signal Processing Solutions*, Jan. 1998.
Fixed point DSP, http://www.bores.com/chips/fixed.htm, 1 page;, Dynamic, range, http://www.bores.com/chips/range.htm, 1 page;, Precision, http://www.bores.com/chips/precis.ht//m, 1 page;, The 'zoom' FFT, http://www.bores.com, 3 pages.
Anshu Dubey, "Parellel Multidimensional FFT," http://astro.uchicago.edu/Computing/On_Line/fft/fft.html, 1 page; Introduction, http://astro.uchicago.edu/Computing/On_Line/fft/node1.html, 2 pages; Distributed Algorithm, http://astro.uchicago.edu/Computing/On_Line/fft/node2.html, 4 pages.
A Look at the Mixed Radix FFT for 1000 Points, http://www.tektronix.com/Measurment/App_Notes/fft/mix.html, 4 pages.

(Continued)

*Primary Examiner*—Kevin Burd
*Assistant Examiner*—Freshteh Aghdam
(74) *Attorney, Agent, or Firm*—Darby & Darby

(57) ABSTRACT

A method and apparatus for extending the dynamic range of an integer or fixed-point Fast Fourier Transform ("FFT") system that may be used in communications devices such as ADSL modems. The disclosed FFT system utilizes a shift control module to increase the effective dynamic range of the FFT implementation by selectively choosing at least one stage of an FFT butterfly implementation in which the outputs of the butterfly stage are not divided to otherwise avoid overflow problems.

21 Claims, 5 Drawing Sheets

OTHER PUBLICATIONS

Computational Frameworks for the Fast Fourier Transform, http://www.cs.cornell.edu/cv/Books/fft.htm, 7 pages.

John a. C. Bingham, "Multicarrier Modulation for Data Transmission: An Idea Whose Time Has Come," *IEEE Communications Magazine*, May 1990, vol. 28, No. 5, pp. 5-14.

John A.C. Bingham, "Multicarrier Modulation for Data Transmission: An Idea Whose Time Has Come," *IEEE Communications*, May 1990, pp. 5-14.

J. Cioffi, "A Multicarrier Primer", TE1.4/91-157, ANSIT1E1.4.

P. Duhamel and M. Vetterli, "Fast Fourier transform: A tutorial review and a state of the art," IEEE Signal Processing, vol. 19, No. 4, Apr. 1990 at 259-299.

Guy R. L. Sohie, and Wei Chen, "Implementation of Fast Fourier Transforms on Motorola's Digital Signal Processors," DSP56000/DSP56001 and DSP 96002 Digital Signal Processors, Motorola Inc. (1991).

Network and Customer Installation Inerfaces Asymmetric Digital Subscriber Line (ADSL) Mtallic Interface, ANSIT1. 413 (1998).

* cited by examiner

Shift Control Module
Utilizes One Control at a Time

Serial Stages (Stage 1, then Stage 2)

Basic Split Radix Butterfly

Split Radix Implementation of 8 Point FFT

EFFICIENT FFT IMPLEMENTATION FOR ASYMMETRIC DIGITAL SUBSCRIBER LINE (ADSL)

FIELD OF THE INVENTION

The present invention relates generally to the field of signal processing. More particularly, the present invention relates to an improved fixed-point Fast Fourier Transform ("FFT") processor and method.

BACKGROUND OF THE INVENTION

Fourier transforms ("FT") decompose linear signals or waveforms into sinusoids identified by frequency. The sum of the various frequency sinusoids equals the original waveform. One type of FT is the Discrete Fourier Transform ("DFT"). DFTs decompose original signals into discrete sample values. The samples are identified by discrete frequency and amplitude values. Digital devices require discrete sample values and thus implement DFTs. One type of DFT is the Fast Fourier Transform ("FFT"). FFTs reduce DFT computation time by employing a "divide and conquer approach." The "divide and conquer" approach divides data points into a plurality of FFT subsets. Two examples of FFT "divide and conquer" approaches are decimation in time ("DIT") and decimation in frequency ("DIF").

When implementing an FFT "divide and conquer approach," the processor computing the FFT calculation performs the FFT calculation in each FFT subset that the data points have been separated into. Because each FFT subset contains a number of data points fewer that the original number of data points, the total number of calculations performed is reduced. For example, by halving the data points, only one quarter of the calculations is performed for the full DFT implementation in each FFT subset of data points.

The internal architecture of Digital Signal Processors ("DSPs") often determines which "divide and conquer approach" is utilized. For example, with DSPs such as Motorola DSP56001 and DSP96002, the DIT approach is used because the DIT approach is computed in fewer instruction cycles than the DIF approach. While the present invention is described with regard to the DIT approach, it should be understood that the present invention is equally compatible to other "divide and conquer" approaches, such as the DIF approach.

One type of FFT is the radix-2 FFT. The radix-2 FFT recursively divides data points. A binary shift right method is used to divide the data points at each output stage of the radix-2 FFT butterfly. By halving the output stage data points, the radix-2 FFT reduces the original number of data points by a factor of two. Consequently, the computational complexity of the radix-2 FFT is reduced by N, the number of data points, multiplied by the base two log of N, i.e., N $\log_2$ N. By reducing the number of data points, the output is accordingly reduced, thereby preventing overflow errors. Overflow occurs when memory size is not large enough to store all the data points. To prevent overflow in an eight (8) point radix-2 butterfly FFT implementation, typically either the inputs are limited to one eighth of the available dynamic range, or an output division method is utilized whereby a division by two is performed at each stage of the output.

Another type of FFT is the radix-4 FFT. While the radix-2 FFT reduces the original number of data points by a factor of 2, the radix-4 FFT reduces the number of data points by a factor of 4. The radix-2 FFT calculates a separate FFT for each data point subset. The radix-4 FFT divides the original data set into four subsets, and then calculates a separate FFT for each of the four subsets. Another FFT algorithm is the split-radix FFT.

The split-radix FFT is a hybrid combining features from the radix-2 and the radix-4 FFT approaches. Similar to the radix-4 FFT, the butterfly of the split-radix has four inputs. Similar to the radix-2 FFT implementation, the butterfly of the split-radix divides the output into two subsets. One subset calculates the radix-2 FFT, while the other subset calculates the radix-4 FFT. By mixing the two radixes, the split-radix FFT enables an implementation which minimizes the multiplication calculations.

FFT implementations are commonly performed using a butterfly block system. While the butterfly block system differs slightly for the DIF and DIT approaches the present invention will be described with reference to a DIT approach. However, as mentioned above, the present invention is equally compatible with the DIF butterfly block system. The FFT with its recursive nature is calculated by interactively applying a conventional butterfly system block. Each iteration is called a stage.

The structure of the prior art radix-2 FFT butterfly block system can be seen in FIG. 1. The radix-2 FFT butterfly outputs, C and D, can be up to twice the dynamic range of the inputs, A and B. The C and D outputs are defined by:

$$D = A - e^{-j}B \quad \text{(eq. 1)}$$

$$C = A + e^{-j}B \quad \text{(eq. 2)}$$

The inputs, A and B, of the radix-2 FFT butterfly system block can be two complex or real numbers. With fixed-point radix-2 FFT implementations, the inputs, A and B, will be integers that utilize a fixed storage size such as 16 or 32 bits per integer. The outputs, C and D, are two corresponding complex or real numbers which can use the same fixed-point representation. With fixed-point complex number implementation, the outputs are:

$$\text{Real}(D) = \text{Real}(A) - ((\text{Real}(B)*\text{Real}(Ep.) - \text{Imag}(B)*\text{Imag}(Ep))) >> N; \quad \text{(eq. 3)}$$

$$\text{Imag}(D) = \text{Imag}(A) - ((\text{Real}(B)*\text{Imag}(Ep) + \text{Imag}(B)*\text{Real}(Ep))) >> N; \quad \text{(eq. 4)}$$

$$\text{Real}(C) = \text{Real}(A) + ((\text{Real}(B)*\text{Real}(Ep) - \text{Imag}(B)*\text{Imag}(Ep))) >> N; \quad \text{(eq. 5)}$$

$$\text{Imag}(C) = \text{Imag}(A) + ((\text{Real}(B)*\text{Imag}(Ep) + \text{Imag}(B)*\text{Real}(Ep))) >> N; \quad \text{(eq. 6)}$$

wherein A and B represent inputs; C and D represent outputs; "Imag" represents the imaginary part of the complex number; "Real" represents the real part of the complex number; ">>N" represents the binary operation "shift right by N bits," equivalent to multiplication by $2^{-N}$; and Ep represents the fixed point representation of $e^{-j}$ derived from the formula:

$$Ep = \text{Round}(e^{-j}*2^N) \quad \text{(eq. 7)}$$

wherein the Round function rounds the solution to the nearest integer. FFT implementations utilize floating-point, integer, and fixed-point processors. A floating-point number has both a mantissa and an exponent and accordingly requires a subset of bits for both. Floating-point processors typically maintain precision to the size of the mantissa and therefore have greater dynamic range than other types of processors. Floating-point processors can store large numbers of data points such that overflow errors are avoided.

Fixed-point and integer processors however unlike floating point processors do not have the same overflow capacity. Sometimes fixed-point processors encounter overflow problems. However, even with the overflow problems, some applications require fixed-point and integer processors. Fixed-point or integer processors are advantageous in terms of size, speed and cost for certain applications. Integer or fixed-point processors often must be scaled to avoid overflow problems. However, scaling takes time, results in further reductions of precision and/or dynamic range, and detrimentally affects a system's signal-to-noise ratio.

To understand overflow errors one can look at the radix-N butterfly processor. In a radix-N butterfly processor every output is the sum of each of the N inputs multiplied by the applicable rotation factor ($e^{-j}$). The rotation factor, $e^{-j}$, has a unity amplitude. Potentially, the outputs can be up to N times larger than the inputs. If the same processor reserves the same memory for both input and output, capacity overflow will occur. This is because as mentioned above with radix-N butterfly processors output can be up to N times larger than input. Thus, to avoid these overflow errors, the radix-N processors is scaled by recursively dividing the output at each butterfly stage by N. In a radix-2 FFT, for example, the number of the outputs at each butterfly stage is recursively divided by two. In an 8 point radix-2 FFT, in stage 1, four butterflies will be performed on the 8 inputs, thereby creating 8 outputs. Then in stage 2, the radix-2 FFT groups the 8 outputs into two sets of four. In stage 2, two butterflies will be performed on each set of four. Thereby, implementing the N $\log_2$ N equation. Consequently, also creating a potential overflow problem. Another prior art FFT performs the butterflies before each stage of butterflies. In this case, without any additional scaling, the size of the outputs can be up to twice as large as the inputs. To prevent overflow, prior art designs performed a division by two.

The overflow prevention methods are found in FFT communication systems that use Discrete Multi-Tone ("DMT") modulation, a form of multi-carrier modulation. DMT modems typically use an FFT system structure and are well known in the art. See, for example, John A. C. Bingham, *Multi carrier Modulation for Data Transmission: An Idea Whose Time Has Come*, IEEE COMMUNICATIONS, May 1990, at 5–14, which is herein incorporated by reference in its entirety and J. Cioffi, *A Multicarrier Primer*, T1E1.4/91-157, ANSI T1E1.4, which is incorporated herein by reference in its entirety. As described in the ANSI standards documents, the line code for Asymmetric Digital Subscriber Line ("ADSL") modems is DMT as discussed in *Network and Customer Installation Interfaces—Asymmetric Digital Subscriber Line (ADSL) Metallic Interface*, ANSI T1.413 (1998), which is incorporated herein by reference in its entirety. Moreover, methods for fixed-point calculation of FFTs are also well known in the art as discussed in P. Duhamel and M. Vetterli, *Fast Fourier transform: A tutorial review and a state of the art*, IEEE SIGNAL PROCESSING, vol. 19, no. 4, April 1990, at 259–299 and Guy R. L. Sohie, *Implementation of Fast Fourier Transforms on Motorola's DSP56000/DSP56001 and DSP 96002 Digital Signal Processors, Motorola Inc.* (1991), which are incorporated herein by reference in its entirety.

In sum, to prevent overflows in the radix-N fixed-point FFT calculation, prior art processors constrain either the range of inputs or outputs before storing in memory. As discussed in a radix-2 FFT implementation, it is common to divide each butterfly output by two. With each butterfly output divided by two, there is a loss of one bit of dynamic range. If outputs are not constrained, in the alternative, inputs can be reduced. The other approach limits input range before each butterfly stage by 1/N, by using guard or unused input bits. In any case, prior art methods to avoid overflow errors have the disadvantage that they limit the processor's dynamic range.

SUMMARY OF THE INVENTION

These and other problems are addressed by the fixed-point/integer processor and method of the present invention. The present invention implements an improved fixed-point or integer FFT which improves dynamic range in communication devices such as, but not limited to, ADSL modems. The improved FFT process of the present invention improves dynamic range by selectively preventing output stage division during at least one output stage.

The present invention involves a method in an FFT system for extending the dynamic range of communication signals in communication devices. First, a communications signal is obtained. The communication signal comprises a set of data points having a set of signal characteristics. Then, an output division of the communication signal data points is enabled at each output stage of the FFT system during a first communications signal transmission. Next, a maximum output communication signal is sampled during the first signal transmission. Then, a maximum output signal during a second signal transmission is predicted using the signal characteristics of the communication signal during the first communications signal transmission. Then, a number of unnecessary output divisions for each output stage of the FFT system during the second signal transmission is predicted. The number of unnecessary output divisions is determined from the predicted maximum output signal during a second signal transmission and from the maximum output communication signal sampled during the first signal transmission. Finally, the output stage division is disabled for at least one output stage of the FFT system during the second signal transmission using the number of unnecessary output divisions determined in the calculating step.

BRIEF DESCRIPTION OF THE DRAWINGS

The foregoing and other features of the present invention will be more readily apparent from the following detailed description and drawings of the illustrative embodiments of the invention wherein like reference numbers refer to similar elements throughout the several view and in which.

DETAILED DESCRIPTION OF THE ILLUSTRATIVE EMBODIMENTS

Figure 1:
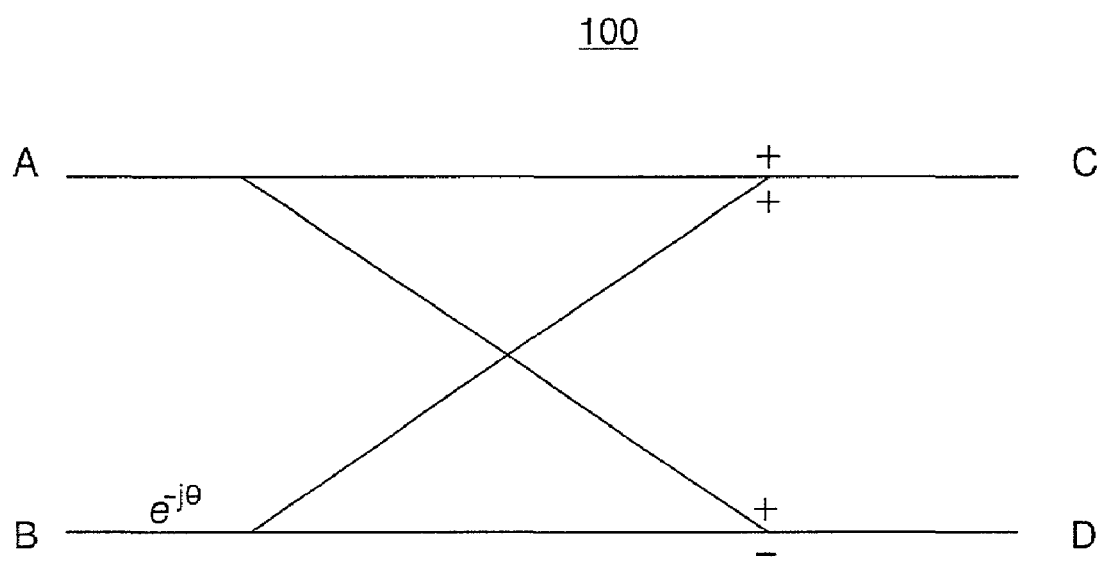
FIG. 1 is a diagram illustrating a prior art radix-2 butterfly FFT implementation.

By way of overview, a preferred embodiment of the present invention involves an improved fixed-point/integer processor design with circuitry implementing an FFT with increased effective dynamic range. The processor circuitry includes a shift control module and a shift calculator which adjusts the processor's FFT shift parameters so as to increase the processor's dynamic range. Dynamic range is increased by disabling the output division at a certain number of output stages. The number of disabled output stages is determined based on the input signal's characteristics. The processor evaluates the input signal's characteristics using circuitry implementing the following two equations:

$$R = 2^{(M-1)-D-G-H} \quad \text{(eq. 8)}$$

wherein R represents the greater or equal value of the maximum value of the REVERB signal after the shift control module is set to s (defined below); M represents the number of bits used in the data storage word (e.g., for a 16 fixed-point word, M=16); D represents the maximum difference in bit usage amongst the various input signals; G represents the maximum allowed gain change; H represents headroom, or in other words, a safety factor selected to protect against overflow errors (e.g., for most ADSL applications, H=0.5 bit). It should be noted that 1 bit is approximately equal to 6 dB. The variables used to determine R can be determined through signal testing, or, alternatively, hard coded in the system during the system design phase.

$$s = \text{floor}\left(\log_2\left(\frac{R}{|B_m|}\right)\right) \quad \text{(eq. 9)}$$

wherein s represents the number of output stages for which output division is unnecessary; $B_m$ represents the maximum value of the REVERB signal before the shift control module is set to s; R represents the predicted maximum value of the REVERB signal after the shift module is set to s; and floor represents a function which returns the closest integer value.

In ADSL, the parameter SHOWTIME refers to the normal, steady state operation of a modem, while the parameter REVERB refers to a signal which includes all the DMT signal characteristics at nominal power. The REVERB signal is often used as a test signal to determine B. It should be noted that the FFT output during the REVERB signal is denoted by Y(n)=FFT {x(n)} wherein Bm is defined as Bm=max{|Y(n)|}.

A preferred embodiment of the present invention is described in detail below with reference to the figures. While the preferred embodiment is described with reference to an ADSL modem, the preferred embodiment is not limited to ADSL implementations. Other applications include, but are not limited to radix-2, radix-4, split-radix, and mixed radix FFT applications.

Moreover, the preferred embodiments of the invention are discussed below with reference to a system and method to improve dynamic range and signal-to-noise ratio of integer and fixed-point DSP implementations of FFTs. However, as one of skill in the art can appreciate, the invention can be applicable to other systems.

The improved FFT processor's output division method divides the output at selective stages of the FFT implementation. The divisor depends on the radix value. For example, a radix-4 butterfly implementation has two output stages and can potentially utilize a division by two at each stage. Thus, the divisor value in a radix-4 butterfly is four.

Figure 2:
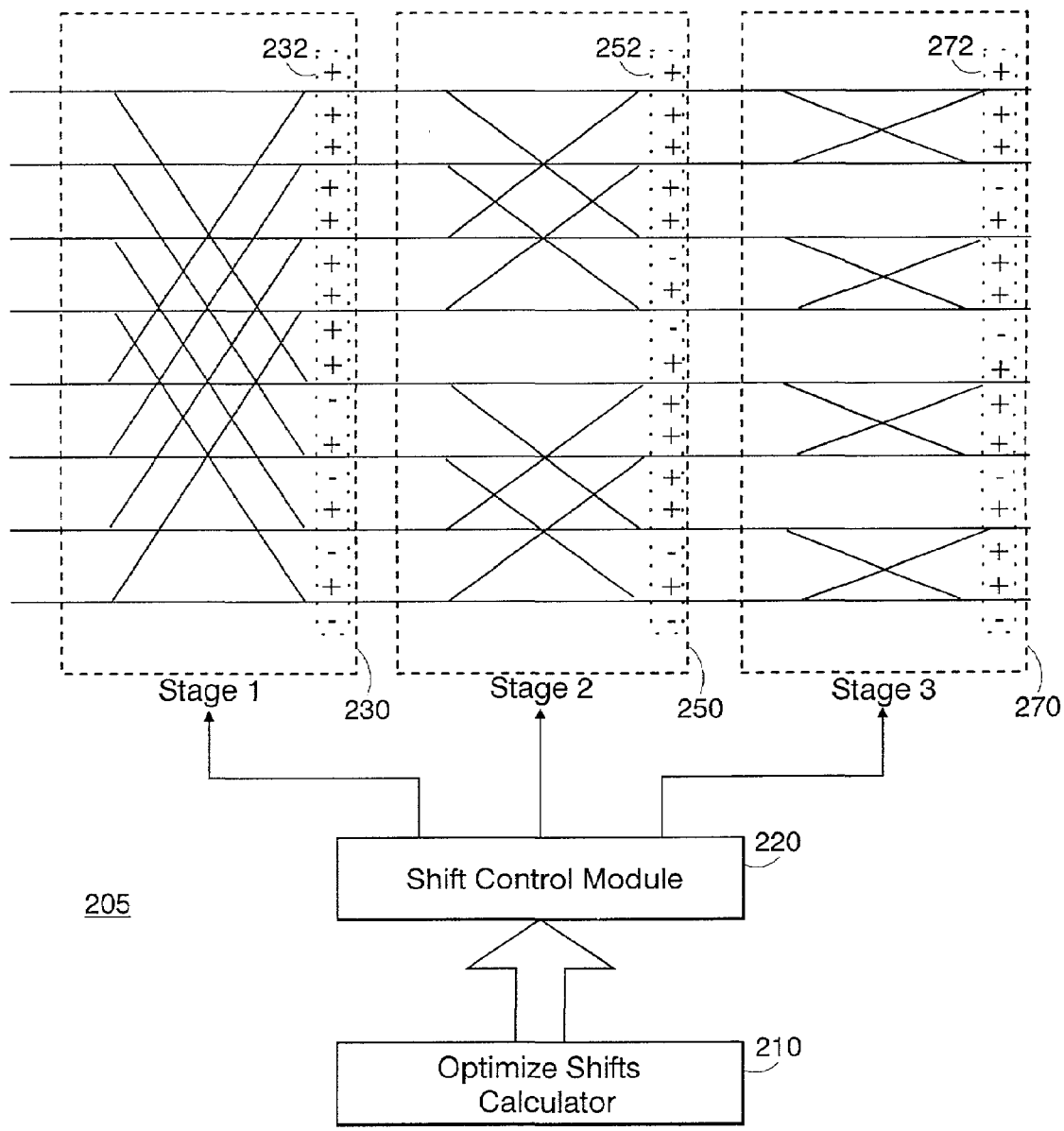
FIG. 2 is a block diagram illustrating a radix-2 butterfly FFT implementation with division control according to a first embodiment of the invention.

FIG. 2 is a block diagram illustrating a first preferred embodiment of a butterfly FFT implementation according to the present invention using an 8 point radix-2 FFT. The 8 point radix-2 FFT 205 depicted in FIG. 2 has three butterfly stages 230, 250, and 270. According to this embodiment, the output division is performed only at select output stages whereas the prior art FFT processors divided at each output stage 230, 250 and 270. The binary shift-right function performs the output division, while the shift control module 220 selects the output stage.

The optimized shift calculation module 210 sends its outputs to the shift control module 220. The optimized shift calculation module 210 module determines the output stage to be divided. In one embodiment, implemented in an ADSL modem, the shift selection calculation function is preferably performed during the modem training process whereby the optimum shift settings are calculated according to the process shown in FIG. 3.

Figure 3:
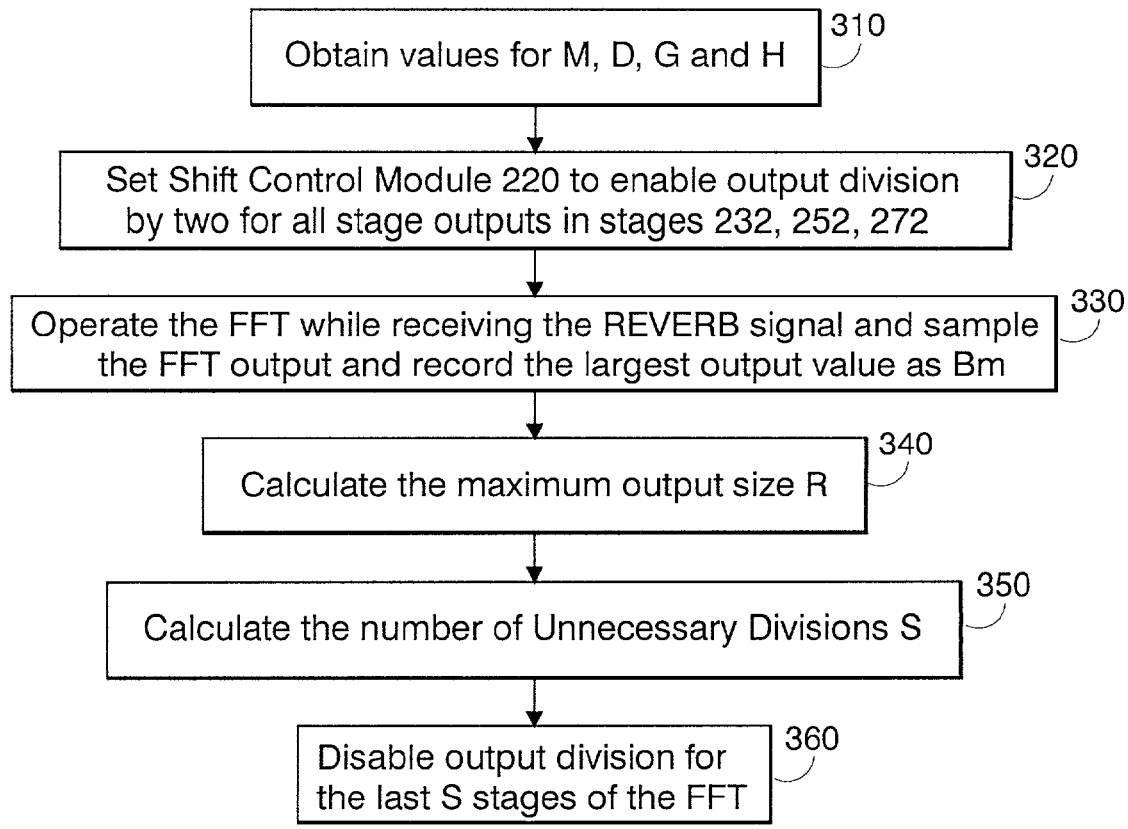
FIG. 3 is a flow diagram illustrating a process to improve the dynamic range of the radix-2 butterfly FFT system using division control according to the first preferred embodiment of the invention.

FIG. 3 is a flow diagram illustrating a process to improve the dynamic range of the butterfly FFT system according to one embodiment of the invention. The processed signal of the preferred embodiment is an ADSL communications signal which has several standard characteristics and components that are well known in the art. In step 310, the processor determines the input signal's characteristics based on the REVERB parameter or signal. From the REVERB signal the processor in step 310 determines the signal's maximum allowed gain change G, data width M, maximum change in bit usage amongst various input signals or constellations D, and headroom H.

With ADSL communications, using the signal characteristics, M, D, G, and H, the processor for the present embodiment determines the predicted maximum value of the FFT output, R, during REVERB, after the number of unnecessary divisions, s, is set. The processor then chooses the R segment to be less than the maximum possible output value for the whole FFT output signal. The processor evaluates the signal's parameters, such as the maximum signal value at the current power level and change in gain or tone power, G. Other signal parameter evaluations include testing the signal during later stages such as SHOWTIME with the desired headroom H. Accordingly, with ADSL communications, the present embodiment reduces the number of output stages divided by two, using parameter choices which prevent overflow caused by factors such as noise.

The variables used for determining R can be hard coded into the system during the system design phase. ADSL standards define the maximum change in each tone power G, as less than or equal to 2.5 dB (~0.5 bit). For ADSL standards, the maximum difference in bit usage between different constellation sizes, D, is usually set to less than 1.5 bits. While D can be set, D can also be determined by comparing the largest constellation point for each ADSL constellation size, during signal transmission at nominal power, to the 4QAM constellation point. Normally, the largest D value is obtained when comparing the 15 bit constellation, since the 15 bit constellation size has the worst deviation, approximately 1.3 bits. H, headroom, as explained above, is a safety factor that is selected to protect against overflow errors. For most ADSL applications, an H value of 0.5 bit would be sufficient.

However, it should be noted that H can be adjusted based on a particular application. H is highly application and environment dependent. For example, if an application operates in an environment in which the received signal power changes by 12 dB, an H of 2 bits may be needed. For most ADSL applications, H is set to 0.5 bits.

As can be appreciated by one of skill in the art, the sequence of most of the process steps described herein may be varied to achieve the same result. Once, in step 310, the appropriate M, D, G, and H variables are obtained or set, as described above, in step 320, the shift control module 220 is set to enable binary shift division by two at each output 232, 252, and 272 of each respective stage 230, 250, and 270. In step 330, the 8 point radix-2 FFT 205 operates on an input bit stream preferably obtained from a received signal such as an ADSL REVERB signal or other such signal carrying all DMT carriers at nominal power. The output of the 8 point radix-2 FFT 205 is then sampled in step 330 for each processed FFT to obtain the maximum bin, $B_m$. It should be noted that with ADSL applications, an FFT of 64 (or 128) point typically is used for the central office modem (ATUC) and a 512 point FFT is used for the remote terminal modem (ATUR).

Next, in step 340, R is predicted using equation 8. R's signal value is greater than or equal to the maximum signal received during the REVERB signal once the shift module has been set with the number of unnecessary divisions, s. For purposes of illustrations only, M=16; D=1.5; G=0.5 and H=0.5. Accordingly, for this preferred embodiment, using a 16 bit fixed-point FFT implementation, where M=16, it can be expected that the signal transmission at each bin can change by up to 3 dB. Thus, to prevent against overflow, H should be set to 3 dB or 0.5 bit. Thus, $R=2^{(16-1)-1.5-0.5-0.5}=5792.62$. Once R has been determined instep 340, next, in step 350, the number of unnecessary divisions, S, is calculated according equation 9. After determining s, in step 360, the processor's shift control module 220 is set to disable the division in the last stages of the 8 point radix-2 FFT implementation 205. Thus, the preferred embodiment of the present invention insures that during the REVERB signal, the maximal bit usage does not exceed the maximum number that can be represented with the implemented fixpoint FFT. Consequently, under or overflows are avoided during the ADSL Showtime transmission.

Figure 4:
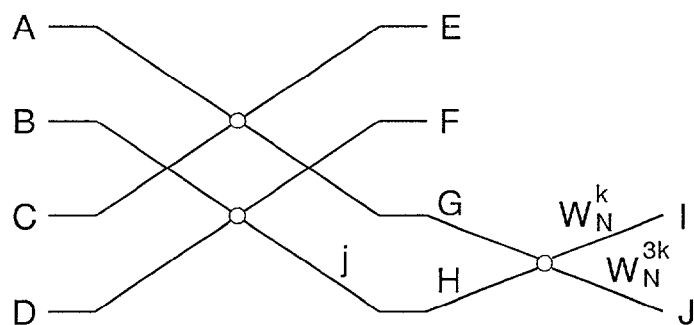
FIG. 4 is a diagram illustrating a prior art split-radix butterfly FFT implementation.
Figure 5:
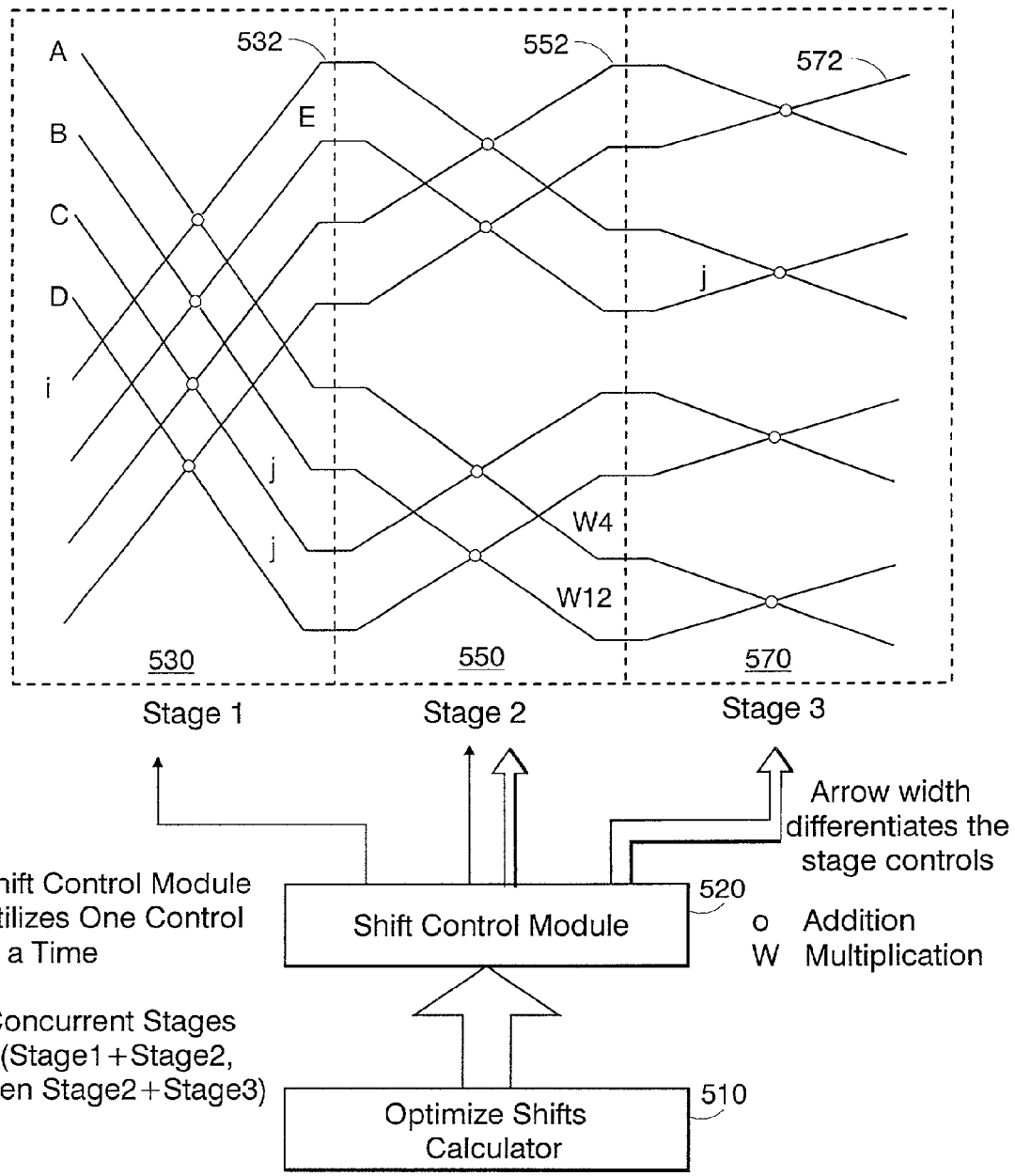
FIG. 5 is a diagram illustrating a split-radix butterfly FFT implementation with division control according to a second preferred embodiment of the invention.
Figure 6:
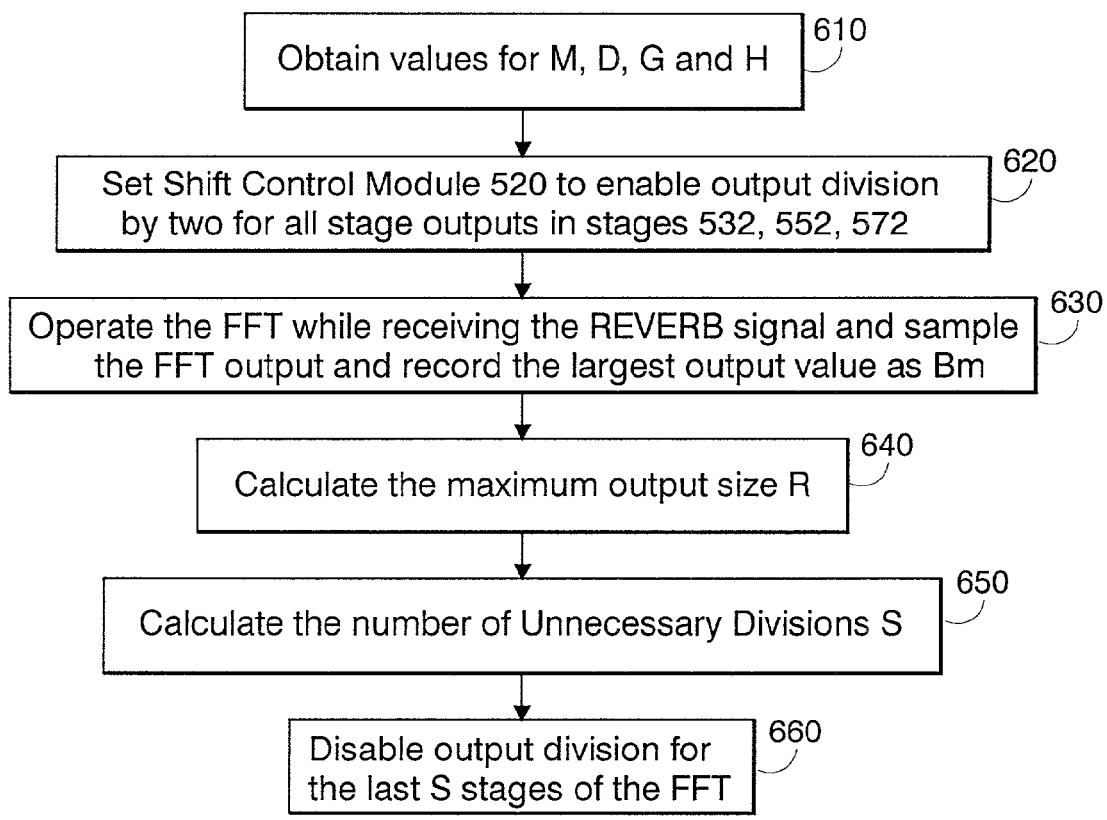
FIG. 6 is a flow diagram illustrating a process to improve the dynamic range of the split-radix butterfly FFT system using division control according to the second preferred embodiment of the invention.

FIGS. 2 and 3 describe an 8 point radix-2 FFT processor implementation while FIGS. 5 and 6 describe an 8 point split-radix implementation. The present invention can operate on either kind of FFT. The selection of FFT type is application dependent. For some applications, a split-radix FFT will be more efficient, while for other applications a radix-2 or radix-4 returns more efficient results. FIG. 4 depicts a diagram of a prior art split-radix butterfly building block. The split-radix butterfly block's four outputs are given by the following formulas:

$$E = A + C \quad (\text{eq. 10})$$

$$F = B + D \quad (\text{eq. 11})$$

$$I = (G + jH)W^*_N = ((A-C) + j(B-D))W^*_N \quad (\text{eq. 12})$$

$$J = (G - JH)W^{3k}_N = ((A-C) - j(B-D))W^{3k}_N \quad (\text{eq. 13})$$

$W_N = \cos(2\pi/N) - j\sin(2\pi/N)$; N=FFT size

FIG. 5 illustrates a split-radix FFT implementation according to an alternative embodiment of the present invention using an 8 point split-radix FFT. This embodiment depicts the three butterfly stages 530, 550 and 570 of the 8 point split-radix FFT 505. In this embodiment, as in the radix-2 embodiment the division by two is performed only at select output stages. While FIG. 2 describes the radix-2 FFT implementation and FIG. 5 describes the split-radix FFT implementation, the formulas are generally the same for both implementations. However, the method of the division control differs with the two embodiments.

In the radix-2 butterfly, only one control enables or disables the output division. As can be seen in FIG. 2, the system completes one stages at a time, serially. Therefore only one control line implements a stage division at any given time. In the split-radix implementation of FIG. 5, as shown the system does not complete each stage serially. As shown in FIG. 5, some of the outputs span two stages. Note the continuous line pattern of the butterflies in FIG. 5 as compared with the discrete line patterns in FIG. 2. Thus, with the split-radix implementations, two controls are needed concurrently, not serially, to enable or disable the division. Whereas with the radix-2 butterfly of FIG. 2 the stages follow serially (e.g. stage1 and then stage2), with the split-radix of FIG. 5 two stages follow concurrently (e.g. stage1+stage2 and then stage2+stage3). Therefore at any given time with the radix-2 butterfly of FIG. 2, one control is utilized, whereas at any given time with the split-radix butterfly of FIG. 5 two controls are utilized. The division by two in the split-radix embodiment is preferably performed using a binary shift-right function. The shift control module 520 coordinates the output division.

The shift control module 520 receives an input from an optimized shift calculation module 510, the latter module determining which stages receive an output division. As explained above, the shift calculation modules 510 calculates the parameter s which is the number of stages that the shift is not needed to be performed in. The s parameter is then fed to the shift control module 520 which disables the shift at the last s stages. The shift selection calculation function in the split-radix embodiment is preferably performed during the ADSL modem training process whereby the optimum shift settings are determined according to the process shown in FIG. 6. Referring to FIG. 6, therein is illustrated a flow diagram illustrating a process to improve dynamic range of a system according to the second embodiment of the invention. As can be appreciated by one of skill in the art, the sequence of most of the process steps may be varied to achieve the same result. Moreover, also as can be appreciated the step sequence in FIG. 6 is similar to the step sequence of FIG. 3. As in FIG. 3, first in step 610, values are obtained for M, D, G, and H. As before, these values are obtained during the ADSL modem's REVERB transmissions or any other transmission during which DMT signal characteristics are all present. Next in step 620, the shift control module 520 enables output division by two for all output stages 532, 552, 572. Next in step 630, the processor samples the split-radix FFT for the largest output value, $B_m$. Having determined, M, D, G, H, and $B_m$, next in step 640, the processor determines R. With R calculated, next in step 650, the processor determines the number of unnecessary output divisions s. Finally, in step 660, the output division is disabled for the lasts stages of the FFT.

The present invention is implemented with a dedicated DSP having the FFT algorithm herein disclosed implemented in the DSP software. The software within the DSP implements equations 8 and 9. In the DSP code, each time the prior art algorithm is performed the DoShift bit is set. The prior art algorithm as mentioned above performs the shift at each butterfly output stage. So essentially if the enable bit is set to true the classic FFT implementation is returned. During the initialization stage another DSP implements the "Optimize Shift Calculator" to calculate the S parameter. Then the FFT DSP software sets the "Current Stage" register before the start of each butterfly stage. The Adder hardware then checks if the shift is enabled or disabled on the last S stages.

The system and method of the present embodiment are implemented in any number of communications or other related schemes where increased dynamic range of an FFT system is beneficial, e.g., in embedded telecommunications systems, modems, and other wire-line and non-wireline signal transfer applications. The system may be implemented in embedded applications or as part of a larger data communications system.

While the invention has been described with reference to ADSL modems, the invention is, of course, useful in other digital signal processing and communications systems which require extended effective dynamic range of an FFT system.

Although the preferred embodiments have been disclosed for illustrative purposes, those skilled in the art will appreciate that many additions, modifications and substitutions are possible without departing from the true scope and spirit of the invention as defined by the accompanying claims.

The following is a computer source code listing written in the C++ programming language further describing the implementation of the Split-Radix FFT with division control in accordance with the second illustrative embodiment of the present invention as shown in FIG. 5. Those of ordinary skill in the art will appreciate that while this implementation has been described using C++ programming code, other programming codes could be substituted without affecting the functionality of the implementation.

```
                    //
#include <stdio.h>
#include <iostream.h>
#include <float.h>
#include <math.h>
#include <string.h>
// Project Includes
#ifdef ENABLE_ERROR_LOGGING
#include "Err.h"
#endif
#include "Buffer.h"
#include "Global.h"
///////////////////// PUBLIC /////////////////////////////////
// ==========Life Cycle=============
Fft::Fft(int size,int numOfShifts, int dataRes, int coeffRes)
{
    Init(size, 1, dataRes, coeffRes);
    SetNumOfShifts(numOfShifts);
    PrepareCosTab();
/*  WriteFormat    Format(HEX, HARDWARE);
    CString s1("fflog.dat");
    pmFftLog = new Logger<FixedVec32>(s1, false, Format, 300);
*/
}
Fft::Fft(const Fft& f)
{
    Init(f.mFftSize, f.mRoundBit, f.mDataResolution, f.mCoeffResolution);
    *pmOutputAddr   = *(f.pmOutputAddr);
    *pmCosTab   = *(f.pmCosTab);
    *pmShiftTab = *(f.pmShiftTab);
    *pmInp      = *(f.pmInp);
    *pmOut8         = *(f.pmOut8);
    *pmTet      = *(f.pmTet);
    *pmR        = *(f.pmR);
    *pmT        = *(f.pmT);
    *pmV        = *(f.pmV);
    *pmB        = *(f.pmB);
    *pmSum2         = *(f.pmSum2);
    *pmSum1         = *(f.pmSum1);
    *pmTmp1         = *(f.pmTmp1);
    *pmTmp2         = *(f.pmTmp2);
    *pmTmp3         = *(f.pmTmp3);
    *pmA0       = *(f.pmA0);
    *pmA1       = *(f.pmA1);
    *pmTheta    = *(f.pmTheta);
    *pmInBuff   = *(f.pmInBuff);
    //mStack        = new int[8][2];
    //mStack    = f.mStack;
//  pmFftLog = new Logger<FixedVec32> (f.GetLogger());
    mEnableLogButterflyData   = f.mEnableLogButterflyData;
    mEnableLogData                = f.mEnableLogData;
    mEnableHardwareLogging    = f.mEnableHardwareLogging;
    if(mEnableHardwareLogging)
    {
        *pmFileIn = *(f.pmFileIn);
        *pmFileOutBeforeOrdering = *(f.pmFileOutBeforeOrdering);
        *pmFileOut   = *(f.pmFileout);
    }
}
```

-continued

```
Fft::~Fft()
{
    delete[] pmCosTab;
    delete pmInp; delete pmOut8; delete pmTet; delete pmR;
    delete pmT; delete pmV; delete pmB;
    delete pmSum2; delete pmSum1; delete pmTmp1; delete pmTmp2;
    delete pmTmp3; delete pmA0; delete pmA1; delete pmTheta; delete pmInBuff;
    delete[] pmOutputAddr;
    delete[] pmShiftTab;
//  delete       pmFftLog;
    if(mEnableHardwareLogging)
    {
        delete pmFileIn;
        delete pmFileOut;
        delete pmFileOutBeforeOrdering;
    }
}
void Fft::Init(int size, int roundBit, int dataRes, int coeffRes)
{
    mFftSize           = size;
    mDataResolution    = dataRes;
    mCoeffResolution   = coeffRes;
    mMulOutShift       = coeffRes-1;
    mRoundBit          = roundBit;
    pmOutputAddr       = new int[size/2];
    pmCosTab  = FixedArray<_int32>(size, coeffRes, WARNING,"Fft: pmCosTab");
    mNB2 = mFftSize/2;
    mNBIT = floor( log ( size ) / log ( 2 ) + 0.5 ); // add 0.5 to round the result
    pmShiftTab = new int[mNBIT];
    pmInp    = new CpxFixedVec32(8, dataRes, WARNING, "Fft: pmInp");
    pmOut8   = new CpxFixedVec32(8, dataRes, WARNING, "Fft: pmOut8");
    pmTet    = new CpxFixedVec32(2, coeffRes, WARNING, "Fft: pmTet");
    pmR        new FixedVec32(8, dataRes, WARNING, "Fft: pmR");
    pmT      = new CpxFixedVec32(4, dataRes, WARNING, "Fft: pmT");
    pmV      = new FixedVec32(8, dataRes, WARNING, "Fft: pmV");
    pmB      = new FixedVec32(8, dataRes, WARNING, "Fft: pmB");
    pmSum2   = new CpxFixed32(dataRes,SATURATION,"Fft: pmSum2");
    pmSum1   = new Fixed32(dataRes, SATURATION,"Fft: pmSum1");
    pmTmp1   = new Fixed32(dataRes,SATURATION,"Fft: pmTmp1");
    pmTmp2   = new Fixed32(dataRes,SATURATION,"Fft: pmTmp2");
    pmTmp3   = new Fixed32(dataRes,SATURATION,"Fft: pmTmp3");
    pmA0     = new Fixed32(dataRes,SATURATION;"Fft: pmA0");
    pmA1     = new Fixed32(dataRes,SATURATION Fft: pmA1");
    pmTheta  = new Fixed32(coeffRes, WARNING, "Fft: pmTheta");
    pmInBuff = new FixedVec32(inFftSize,dataRes, WARNING, "Fft: pmInBuff");
    mEnableLogButterflyData = 0;
    mEnableLogData = 0;
    mEnableHardwareLogging = 0;
    if(mEnableHardwareLogging)
    {
        pmFileIn = new ofstream("fftin.dat");
        pmFileOut = new ofstream("fftout.dat");
        pmFileOutBeforeOrdering = new ofstream("fftout1.dat");
    }
}
//===Operators===============
//
//===Operations===============
void Fft::Operate ( FixedVec32& in , CpxFixedVec32& out)
{
    if( in.length() != mFftSize)
        cout<<"input vector size mismatch - this Fft instance has "<<mFftSize<<"elements ";
    //ofstream orderFile("order.txt");
    //ofstream outOrderFile("out_order.txt");
    //int* p_out_order_table = new int[mNB2];   // to hold the ordered address
    //int* p_out_order_conj = new int[mNB2];    // to hold the ordered conj
    //int current_stage;
    int   il,ik,block_length,fft_type,stack_pointer,stack_flag;//,ran_seq[512];
    int   start_index,current_start_index,in_index,bit,bank_bit,ix;
    int   tab_size,gen_ind,value,counter,tab_pointer;
    Fixed32 tmpr( mDataResolution,WARNING,"Fft::fix_fft: tmpr");
    Fixed32 tmpi( mDataResolution,WARNING,"Fft::fix_fft: tmpi");
    long int con2;
    int stage = 0;
    int addr_tab1[16] = {
            0,2,4,5,8,9,10,11,
            16,17,19,18,20,21,23,22
            };
```

```
        int addr_tab2[31] = {
                1,1,0,1,0,1,1,1,0,1,1,1,0,1,0,1,
                0,1,1,1,0,1,0,1,0,1,1,1,0,1,1
                };
        con2 = Fixed<_int32>::MaxFixed(mDataResolution)+1;
//      pmFftLog->Activate( in );
        LogData(in, *pmFileIn);
        // copy input data to inplace buffer
        *pmInBuff= in;
        stack_pointer = 0;
        stack_flag = 1;
        block_length = mFftSize;
        start_index = 0;
        fft_type = 1; // real input
        while (stack_flag==1)
        {
                current_start_index = start_index;
                fft_gen(*pmInBuff, current_start_index, block_length, fft_type);
                stage++;
//      LogData(*pmInBuff, *pmFileIn);
        //current_stage = mNBIT - floor( log(block_length)/log(2) + 0.5 ); // add 0.5 to round
the result
        //orderFile<<"b_length = "<<block_length<<"start index = "<<
        //       current_start_index<<"type = "<<fft_type<<"stage = "<<
        //       current_stage<<endl;
//      pmFftLog->Activate( *pmInBuff);
        if (block_length >= 16)
        { // push a new triple into stack
                if (fft_type == 1) // real input
                {
                        start_index = current_start_index;
                        mStack[stack_pointer][0] = start_index;
                        mStack[stack_pointer][1] = ((block_length/2)<<1) + 1;
                        stack_pointer ++;
                        start_index = start_index + block_length/4;
                        mStack[stack_pointer][0] = start_index;
                        mStack[stack_pointer][1] = ((block_length/4)<<1);
                        stack_pointer ++;
                }
                else       // complex input
                {
                        start_index = current_start_index;
                        mStack[stack_pointer][0] = start_index;
                        mStack[stack_pointer][1] = ((block_length/2)<<1);
                        stack_pointer ++;
                        start_index = start_index + block_length/2;
                        mStack[stack_pointer][0] = start_index;
                        mStack[stack_pointer][1] = ((block_length/4)<<1);
                        stack_pointer ++;
                        start_index = start_index + block_length/4;
                        mStack[stack_pointer][0] = start_index;
                        mStack[stack_pointer][1] = ((block_length/4)<<1);
                        stack_pointer ++;
                }
        }
        if (stack_pointer>0)
        {   // pop new data from stack
                stack_pointer --;
                start_index = mStack[stack_pointer][0];
                block_length = mStack[stack_pointer][1];
                fft_type =block_length&1;
                block_length = (block_length>>1);
        }
        else stack_flag = 0;
}   // while stack_flag
LogData(*pmInBuff, *pmFileOutBeforeOrdering);
// Output address generator
tab_size = 8;
for (ix=0; ix<tab_size; ix++) pmOutputAddr[ix] = addr_tab1 [ix];
gen_ind = 1;
if (tab_size == mNB2) gen_ind = 0;
tab_pointer = 0;
while (gen_ind == 1)
{
        // extend current address table
        in_index = tab_size;
        value = tab_size;
        counter = 0;
        while (counter < tab_size)
```

-continued

```
            {
                if (addr_tab2[tab_pointer] == 1) // 01100110
                {
                    bit = 0;
                    for (ix=0; ix<4; ix++)
                    {
                        pmOutputAddr[in_index] = (value << 1) + bit;
                        in_index ++;
                        bit = bit^1;
                        pmOutputAddr[in_index] = (value << 1) + bit;
                        in_index ++;
                        value ++;
                    }
                }
                else         // 01010101
                {
                    bit = 0;
                    for (ix=0; ix<4; ix++)
                    {
                        pmOutputAddr[in_index] = (value << 1) + bit;
                        in_index ++;
                        bit = bit^1;
                        pmOutputAddr[in_index] = (value << 1) + bit;
                        in_index ++;
                        bit = bit^1;
                        value ++;
                    }
                }
                counter = counter + 8;
                tab_pointer ++;
            }
            tab_size = 2*tab_size;
            if (tab_size == mNB2) gen_ind = 0;
        }
        // Bit reversing
        for (il=0; il<mNB2; il++)
        {
            value = pmOutputAddr[il];
            bank_bit = value&1 ;
            in_index = 0 ;
            for (ik= 0; ik<mNBIT; ik++)
            {
                bit = (value >> ik)&1;
                in_index = (in_index << 1) + bit;
            }
            tmpr = (*pmInBuff)[il];
            tmpi = (*pmInBuff)[il+mNB2];
            if (bank_bit == 1)
            {
                in_index = mFftSize - in_index;
                tmpi = -tmpi;
            }
            out[in_index] = Cpx32(tmpr.Value(), tmpi.Value());
            //// for printing the output ordering table
            //p_out_order_table[in_index] = il;
            //p_out_order_conj[in_index]       = bank_bit;
        }
        LogData(out, *pmFileOut);
        // write '*pmInBuff' to logger
        //pmFftLog->Activate( *pmInBuff);
        //// print the output ordering table
        //outOrderFile<<"to get tone | read from | complement imag"<<endl;
        //for (il= 0; il<mNB2; il++)
        //{
        //    outOrderFile.width(10);
        //    outOrderFile.setf(ios::right, ios::adjustfield);
        //    outOrderFile<<il<<" ";
        //    outOrderFile.width(10);
        //    outOrderFile.setf(ios::right, ios::adjustfield);
        //    outOrderFile<<p_out_order_table[il]<<" ";
        //    outOrderFile.width(10);
        //    outOrderFile.setf(ios::right, ios::adjustfield);
        //    outOrderFile<<p_out_order_conj[il]<<endl;
        //}
        //delete[]      p_out_order_table;
        //delete[]      p_out_order_conj;
    } // Fft::operate
    //=================Access======
    //
```

-continued

```
void Fft::SetNumOfShifts(int n)
{
    if( (n>-2) && (n<=mNBIT) )
    {
        mNumOfShifts = n;
        for (int i=0; i<mNBIT; i++) pmShiftTab[i] = 0;
        if( mNumOfShifts == -1) mNumOfShifts = mNBIT;        // default: shift all stages
        if( mNumOfShifts != 0)
            for (int i=0; i<mNumOfShifts; i++) pmShiftTab[i] = 1;
        //pmShiftTab[0]=0;
        //pmShiftTab[1]=0;
        //pmShiftTab[2]=0;
        //pmShiftTab[3]=0;
        //pmShiftTab[4]=0;
        //pmShiftTab[5]=0;
        //pmShiftTab[6]=0;
        //pmShiftTab[7]=1;
        pmShiftTab[mNBIT-1]=pmShiftTab[mNBIT-2];
        //for(i=0;i<mNBIT;i++) cout<<pmShiftTab[i]<<endl;
    }
    else
        cout<<"Fft::SetNumOfShifts err: shifts out of range"<<endl;
}
void Fft::SetRoundBit(int n)
{
    mRoundBit = n;
}
void Fft:SetLogButterflyData(bool state)
{
    mEnableLogButterflyData = state;
}
void Fft:SetLogData(bool state)
{
    mEnableLogData = state;
}
//==========Inquiry==================
//
////////////////////////PROTECTED////////////////////////////
//
////////////////////////PRIVATE//////////////////////////////
//
void Fft::LogData(FixedVec32& in, ofstream& file)
{
    if(mEnableHardwareLogging)
    {
        if(mEnableLogData)
        {
            file.flags(ios::hex);
            for (int i=0; i<mNB2; i++)
            {
/*                // for 21 bit fft
                int tmp5,tmp2,tmp3;
                tmp5 = in[i]&0x7f
                tmp2 = in[i+mNB2]&0x1fffff;
                tmp2 = tmp2 + (tmp5<<21);
                tmp3 = in[i];
                tmp3 = (tmp3>>7)&0x3fff;
                file.fill('0');
                file.width(4);
                file.setf(ios::right, ios::adjustfield);
                file<<tmp3;
                file.fill('0');
                file.width(7);
                file.set(ios::right, ios::adjustfield);
                file<<(tmp2&0xfffffff)<<endl;
*/
                // for 20 bit fft
                file.fill('0');
                file.width(5);
                file.setf(ios::right, ios::adjustfield);
                file<<(in[i]&0xfffff);
                file.fill('0');
                file.width(5);
                file.setf(ios::right, ios::adjustfield);
                file<<(in[i+mNB2]&0xfffff)<<endl;
/*                // for matlab
                file<<in[i];
                file<<" ";
                file<<in[i+mNB2]<<endl;
```

-continued

```
*/
                }
                file<<endl;
            } // if mEnableLogData
        } // if mEnableHardwareLogging
}
void Fft::LogData(CpxFixedVec32& in, ofstream& file)
{
    if(mEnableHardwareLogging)
    {
        if(mEnableLogData)
        {
            file.flags(ios:hex);
            for (int i=0; i<mNB2; i++)
            {
/*              // for 21 bit fft
                int tmp5,tmp2,tmp3;
                tmp5 = in[i].Real()&0x7f;
                tmp2 = in[i].Imag()&0x1fffff;
                tmp2 = tmp2 + (tmp5<<21);
                tmp3 = in[i].Real();
                tmp3 = (tmp3>>7)&0x3fff;
                file.fill('0');
                file.width(4);
                file.setf(ios::right, ios::adjustfield);
                file<<tmp3;
                file.fill('0');
                file.width(7);
                file.setf(ios::right, ios::adjustfield);
                file<<(tmp2&0xfffffff)<<endl;
*/
                // for 20 bit fft
                file.fill('0');
                file.width(5);
                file.setf(ios::right, ios::adjustfield);
                file<<(in[i].Real()&0xfffff);
                file.fill('0');
                file.width(5);
                file.setf(ios::right, ios::adjustfield);
                file<<(in[i].Imag()&0xfffff)<<endl;
/*
                // for matlab
                file<<in[i].Real();
                file<<" ";
                file<<in[i].Imag()<<endl;
*/          }
            file<<endl;
        } // if mEnableLogData
    } //if mEnableHardwareLogging
}
void Fft::LogButterflyData(ofstream& file, int start_index, int block_len, int nbut, int ik)
{
    if(mEnableHardwareLogging)
    {
        if(mEnableLogButterflyData)
        {
            if(block_len>=16)
            {
                if(((ik==0)|(ik==1)|(ik==nbut))&&(start_index==0)&&(block_len==512))
                {
                    file<<"start_index: "<<start_index<<", "<<"block_len: "<<block_len<<endl<<endl;
                    file<<"ik="<<ik<<endl<<endl;
                    file<<"input"<<endl;
                    for(int i=0;i<4;i++) file<<(*pmInp)[i].Real()<<" "<<(*pmInp_[i].Imag()<<" ";
                    file<<endl<<endl;
                    file<<"teta"<<endl;
                    for(i=0;i<2;i++) file<<(*pmTet)[i].Real()<<" "<<(*pmTet)[i].Imag()<<" ";
                    file<<endl<<endl;
                    file<<"output"<<endl;
                    for(i=0;i<4;i++) file<<(*pmOut8)[i].Real()<<" "<<(*pmOut8[i].Imag()<<" ";
                    file<<endl<<endl;
                }
            }
```

```
            if(block_len==8)
            {
                if(start_index==252)
                {
                    file<<"start_index: "<<start_index<<end1<<end1;
                    file<<"input"<<end1;
                    for(int i=0;i<4;i++) file<<(*pmInp)[i].Real()<<"
"<<(*pmInp)[i].Imag()<<" ";
                    file<<end1<<end1;
                    file<<"teta"<<end1;
                    file<<(*pmTheta);
                    file<<end1<<end1;
                    file<<"output"<<end1;
                    for(i=0; i<4; i++) file<<(*pmOut8)[i].Real()<<"
"<<(*pmOut8)[i].Imag()<<" ";
                    file<<end1<<end1;
                }
            }
            if(block_len==4)
            {
                if(start_index==246)
                {
                    file<<"start_index: "<<start_index<<end1<<end1;
                    file<<"input<<end1;
                    for(int i=0;i<4;i++) file<<(*pmInp)[i].Real()<<"
"<<(*pmInp)[i].Imag()" ";
                    file<<end1<<end1;
                    file<<"output"<<end1;
                    for(i=0;i<4;i++) file<<(*pmOut8)[i].Real()<<"
"<<(*pmOut8)[i].Imag()<<" ";
                    file<<end1<<end1;
                }
            }
        } //if mEnableLogButterflyData
    } //if mEnableHardwareLogging
}
void Fft::PrepareCosTab()
{
    double  twid_cos,twid_val;
    long int con1 = Fixed<__int32>::MaxFixed(mCoeffResolution)+1;
    for (int il=1; il<mFftSize; il++)
    {
        twid_val 2.*3.1415927*il/mFftSize;
        twid_cos = cos(twid_val);
        pmCosTab[il] = con1*twid_cos;
    }
    pmCosTab[0] = con1 - 1;
}
```

What is claimed is:

1. A method for extending a dynamic range of a communication signal used in performing a Fast Fourier Transform ("FFT") process, comprising the steps of:

obtaining a first communication signal comprising a set of data points, the first communication signal having a set of signal characteristics;

enabling an output division of the data points at each output stage of the FFT process during a first communication signal transmission;

determining a maximum output communication signal sampled during the first communication signal transmission;

predicting a maximum output communication signal for a second signal transmission using the signal characteristics of the first communication signal during the first communication signal transmission;

calculating a number of unnecessary output divisions for each output stage of the FFT process during the second signal transmission using the number of unnecessary output divisions determined from the predicted maximum output communication signal in the predicting step and the maximum output communication signal sampled during the first communication signal transmission in the determining step; and selectively disabling the output stage division for at least one output stage of the FFT process during the second signal transmission in accordance with the number of unnecessary output divisions determined in the calculating step.

2. A method as in claim 1, wherein the enabling step divides the communication signal data points utilizing a divide and conquer approach.

3. A method as in claim 2, wherein the divide and conquer approach is at least one of decimation in time and decimation in frequency.

4. A method as in claim 1, wherein the FFT process comprises at least one of a radix-2 butterfly FFT, radix-4 butterfly FFT, and a split-radix butterfly FFT process.

5. A method as in claim 1, wherein the FFT system comprises at least one of a fixed-point and integer FFT process.

6. A method as in claim 1, wherein the predicting step determines the maximum output signal for a second signal transmission according to the following relationship:

$$R=2^{(M-1)-D-G-H}$$

wherein R represents a value approximately equal to or greater than the maximum output signal for the second signal transmission; M represents a number of bits in a data storage word; D represents a maximum difference in bit usage among a set of communication signals; G represents a maximum allowed gain change; and H represents headroom.

7. A method as in claim 6, wherein the predicting step further comprises sampling the first communication signal for M, D, G, and H values.

8. A method as in claim 6, wherein M, D, G, and H are fixed FFT process values.

9. A method as in claim 6, wherein H is approximately 0.5 bits.

10. A method as in claim 6, wherein M is approximately 16.

11. A method as in claim 6, wherein D is approximately 1.5 bits.

12. A method as in claim 6, wherein G is approximately 0.5 bits.

13. A method as in claim 1, wherein the calculating step determines the number of unnecessary output divisions for each output stage of the FFT process for the second signal transmission according to the following relationship:

$$s = \text{floor}\left(\log_2\left(\frac{R}{|B_m|}\right)\right)$$

wherein s represents the number of unnecessary output divisions for each output stage of the FFT process for the second signal transmission; R represents the predicted maximum output signal for a second signal transmission; $B_m$ represents the maximum output communication signal sampled during the first signal transmission; and floor represents a function that returns an integer value.

14. A system for extending a dynamic range of a communication signal in a Fast Fourier Transform ("FFT") process, comprising:
an FFT module having a plurality of selectively disabled output stage divisions;
a shift control module connected to the output stage divisions of the FFT through a control line which disables the output stage divisions of the FFT; and
an optimized shift calculator connected to the shift control module through a command line, the optimized shift calculator determining a number of unnecessary output divisions and instructing the shift control module to disable corresponding number of output stage division;
wherein the optimized shift calculator determines the number of unnecessary output divisions according to the following relationship:

$$s = \text{floor}\left(\log_2\left(\frac{R}{|B_m|}\right)\right)$$

wherein s represents the number of unnecessary output divisions; $B_m$ represents a maximum output communication signal sampled during a first signal transmission; R represents a predicted maximum output signal for a second signal transmission; and floor represents a function that returns an integer value.

15. A system as in claim 14, wherein R is determined according to the following relationship:

$$R = 2^{(M-1)-D-G-H}$$

wherein M represents a number of bits in a data storage word; D represents a maximum difference in bit usage among a set of communication signals; G represents a maximum allowed gain change; and H represents headroom.

16. A system as in claim 15, wherein M, D, G, and H are fixed FFT system values.

17. A system as in claim 14, wherein the control line of the shift control module disables each output division stage of the FFT module in a serial manner.

18. A system as in claim 14, wherein the shift control module further comprises at least two control-lines, a first control line for disabling a first output division stage and a second control line for disabling a second output division stage, wherein the first control line and the second control line disable each output division stage concurrently.

19. A method for extending a dynamic range of a communication signal used in a Fast Fourier Transform ("FFT") system having a set of output stage divisions, comprising the steps of:
calculating a number of unnecessary output divisions for each output stage of FFT system during a second signal transmission period using a maximum output communication signal sampled during a first communication signal transmission period and a number of unnecessary output divisions determined from a predicted maximum output communication signal for the second signal transmission; and
selectively disabling the output stage division for at least one output stage of the FFT system during a second signal transmission in accordance with the number of unnecessary output divisions determined in the calculating step.

20. A method as in claim 19, wherein the calculating step determines the number of unnecessary output divisions for each output stage of the FFT system for the second signal transmission period according to the following relationship:

$$s = \text{floor}\left(\log_2\left(\frac{R}{|B_m|}\right)\right)$$

wherein s represents the number of unnecessary output divisions for each output state of the FFT system during the second signal transmission; R represents the predicted maximum output signal for a second signal transmission; $B_m$, represents the maximum output communication signal sampled during the first signal transmission; and floor represents a function that returns an integer value.

21. A method as in claim 19 wherein, the calculating step determines the maximum output signal for a second signal transmission according to the following relationship:

$$R = 2^{(M-1)-D-G-H}$$

wherein R represents a value approximately equal to or greater than the maximum output signal for the second signal transmission; M represents a number of bits in a data storage word; D represents a maximum difference in bit usage among a set of communication signals; G represents a maximum allowed gain change; and H represents headroom.

* * * * *